United States Patent
Manabe et al.

[11] Patent Number: 5,932,121
[45] Date of Patent: Aug. 3, 1999

[54] WELDING METHOD IN THE OVERHEAD AND VERTICAL POSITIONS

[75] Inventors: Yukio Manabe; Satoru Zenitani; Yoshinori Hiromoto; Yasuyuki Kobayashi, all of Kan-on-shin-machi, Japan

[73] Assignee: Mitsubishi Heavy Industries, Ltd., Tokyo, Japan

[21] Appl. No.: 08/937,116

[22] Filed: Sep. 24, 1997

[30] Foreign Application Priority Data

Sep. 26, 1996 [JP] Japan .................................... 8-275559

[51] Int. Cl.$^6$ ........................................................ B23K 9/08
[52] U.S. Cl. ............................................. 219/123; 219/126
[58] Field of Search .............................. 219/123, 137 R, 219/75, 126

[56] References Cited

U.S. PATENT DOCUMENTS 1,914,518  6/1933  Martin .
4,190,760  2/1980  Kano et al. ............................... 219/123

FOREIGN PATENT DOCUMENTS 1 097 095  6/1955  France .
 336113  5/1972  U.S.S.R. ................................. 219/123

*Primary Examiner*—Clifford C. Shaw
*Attorney, Agent, or Firm*—Evenson, McKeown, Edwards & Lenahan, P.L.L.C.

[57] ABSTRACT

The object of this invention is to prevent a defect which occurs in overhead or vertical welding when gravity causes molten metal to drip downward so that the top of the gap has an undercut and the bead has a bulge along the weld line (i.e., a convex bead is created). During overhead or vertical welding, a unidirectional current is made to flow in the molten pool in the direction of the weld line. When the aforesaid current flows in conjunction with a magnetic field, a Lorentz force is exerted in the molten pool in an upward direction towards the upper top side of the groove. This prevents the molten metal from dripping downward and improves the shape of the bead.

8 Claims, 9 Drawing Sheets

WELDING METHOD IN THE OVERHEAD AND VERTICAL POSITIONS

FIELD OF THE INVENTION

This invention concerns a welding method in the overhead and vertical positions wherein a parent material is melted using a specified heat source to form a molten pool and there is a possibility that the aforesaid molten pool will experience deformation under the influence of gravity. More specifically, it concerns a welding method in the overhead and vertical positions to be used in the production of large structures such as bridges, pressure vessels or the like.

Four welding positions may be used in producing a butt welding: the flat position, the horizontal position, the vertical position, and the overhead position. Generally speaking, the term "overhead position" refers to welding a virtually horizontal joint from below, facing an upward direction. The "flat position" refers to a horizontal joint being welded from above, facing downward. The "horizontal position" refers to welding horizontally a joint whose axis of weld is virtually horizontal. The "vertical position" refers to welding the length of a joint whose axis of weld is vertical.

The applicants have previously filed Japanese Patent Application P6-277594 and PCT Application PCT/JP97/01533 regarding welding in a horizontal position.

BACKGROUND OF THE INVENTION

Because bridges, pressure vessels and other large steel structures cannot easily be inverted during production, there is no choice but to weld them using the overhead and vertical positions.

In overhead welding, the weight of the molten metal itself tends to cause the weld bead to spread downward. When the first layer is welded, this results in an undercut on the top of the gap (A in FIG. 6), and an improper angle of the junction with the walls on the upper top side of the groove (B in FIG. 6). This can cause defects such as inadequate fusion when the subsequent layer is welded. From the second layer on, the underside of the weld bead will have an improper angle of junction just as in the first layer. Inadequate fusion may result in defective welding of each subsequent layer. This is why such welding is usually executed by means of a semi-automated or hand-welding process which entails a high degree of skill.

Even if this welding process is automated, the welding device must have the same level of capability as a skilled worker who performs the process discussed above. A number of webbing mechanisms and close control of heat will be necessary. Since these are not always enough, the welding process must be conducted at a low temperature with low efficiency. This stands in the way of making the welding process more efficient.

In vertical welding, also, gravity tends to cause the molten metal to spread downward when the open end of the groove is too wide, and the parent material provides inadequate surface tension. The problems are the same as in overhead welding: low heat input and poor efficiency.

SUMMARY OF THE INVENTION

The object of the present invention is to provide a welding method in the overhead and vertical positions which would avoid the problem detailed above and which would enable high-efficiency welding.

To solve the above problem which occurs in overhead and vertical welding, the present invention is designed to have the following distinguishing characteristics. In overhead and vertical welding, when the parent material is melted by a heat source which may be an arc, a laser, or an electron beam to form a molten pool, the aforesaid pool tends to become deformed due to the effect of gravity. An electric current is made to flow in the aforesaid molten pool in virtually the same direction as the weld line. (It is permissible for the current to flow parallel to, but not on, the weld line.) A magnetic field is also given in the aforesaid molten pool orthogonal to the direction of the aforesaid current, that is to say, orthogonal to the weld line and parallel to the surface of the parent material. While welding is executed, a Lorentz force is thereby exerted in the aforesaid molten pool, in an upward direction in the groove.

We shall explain the operation of the present invention with reference to the rough diagram of the lifting bead shown in FIG. 3.

When an electric current is made to flow between auxiliary wires $5a$ and $5b$, a unidirectional current A is generated in molten pool 12. Magnetic field 9 is also given parallel to the surface of the parent material and perpendicular to the weld line. This causes a Lorentz force to be exerted in an upward direction in the groove. Under this force, a weld bead is achieved which does not drip downward.

The means to generate a unidirectional current is not limited to auxiliary wires. When, as in FIG. 8, there is no conductor ahead of the welding arc in the welding direction (as, for example, when the first layer is welded), the welding current generally flows opposite to the welding direction. If an external magnetic field 9 is induced ahead of the welding arc, the result discussed above can be obtained, and the bead will not deform.

DETAILED DESCRIPTION OF THE INVENTION

We shall next explain the present invention with reference to the drawings. To the extent that the dimensions, material, shape and relative positions of the constituent components are not specifically disclosed in these embodiments, the scope of the present invention is not limited by these factors. The embodiments serve merely as illustrative examples.

EMBODIMENT 1

Figure 1:
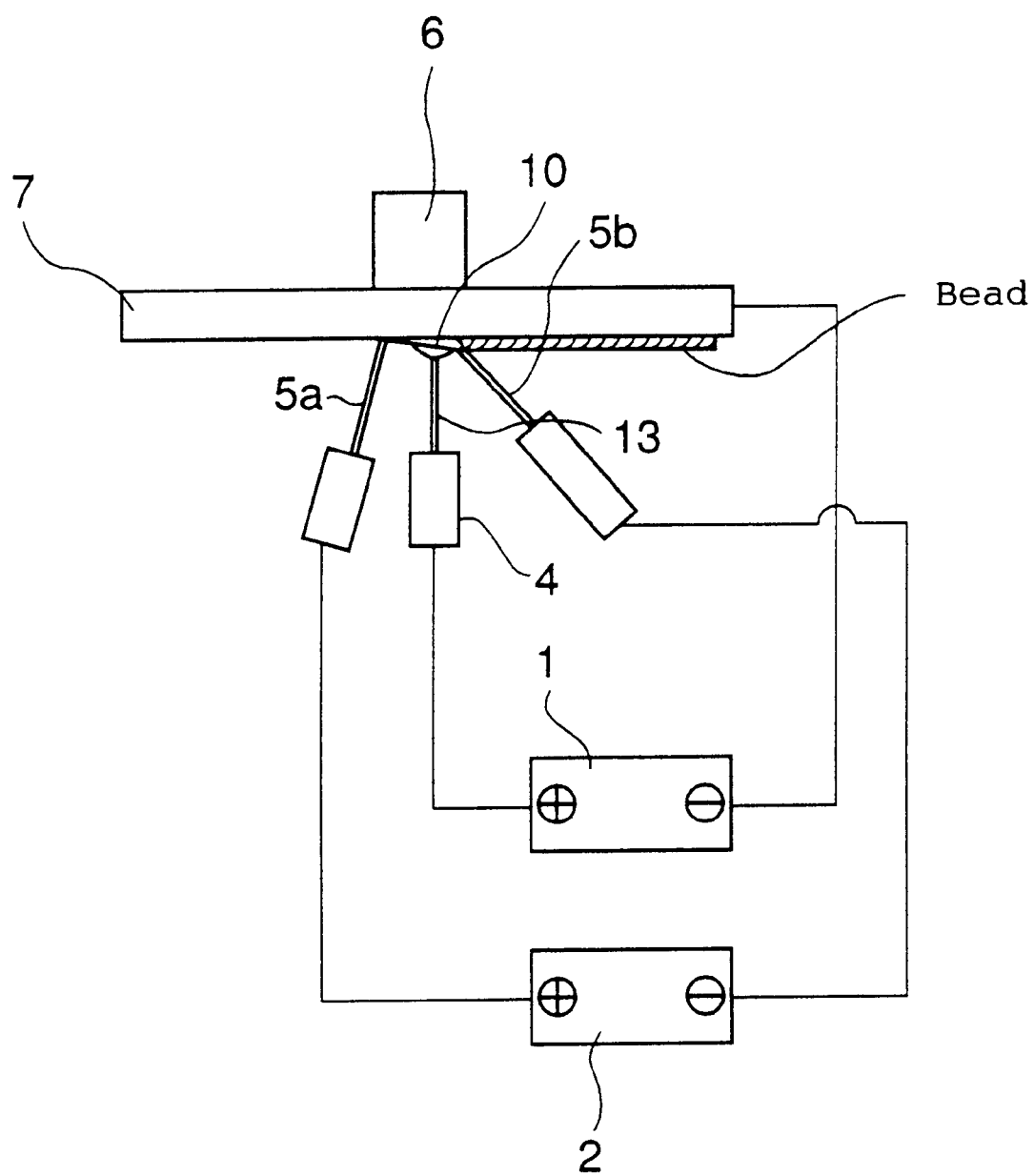
FIG. 1 illustrates the circuit connections in a welding device which is the first ideal embodiment of this invention.

FIG. 1 shows a welding device employing a welding method which is an ideal embodiment of the present invention. This is a method for MAG (metal active gas) welding in the overhead and vertical positions using an arc (heat source 10), and a consumable electrode 13 (the welding wire). In FIG. 1, is the welding power supply 1; an ordinary welding power supply is used. Arc 10 (the heat source) is generated between electrode 13, which protrudes from welding torch 4, and parent material 7. The heat of this arc causes parent material 7 to melt.

On either side of arc heat source 10, along the welding direction, auxiliary (melting) wires 5a and 5b are inserted into the top of molten pool 12. The aforesaid wires 5a and 5b are connected, respectively, to the plus and minus sides of current power supply 2 so as to cause a unidirectional current to flow in the welding direction.

Theoretically, the conductive material chosen for the auxiliary wires should be one which is compatible with the material of the joint.

External permanent magnet or DC electromagnet 6 is placed so as to induce a magnetic field 9 near the rear surface of parent material 7 (the upper top side of the groove) which is perpendicular to the weld line and parallel to the surface of the parent material as seen from welding torch 4. (See FIG. 8 for position of magnet.)

Figure 3:
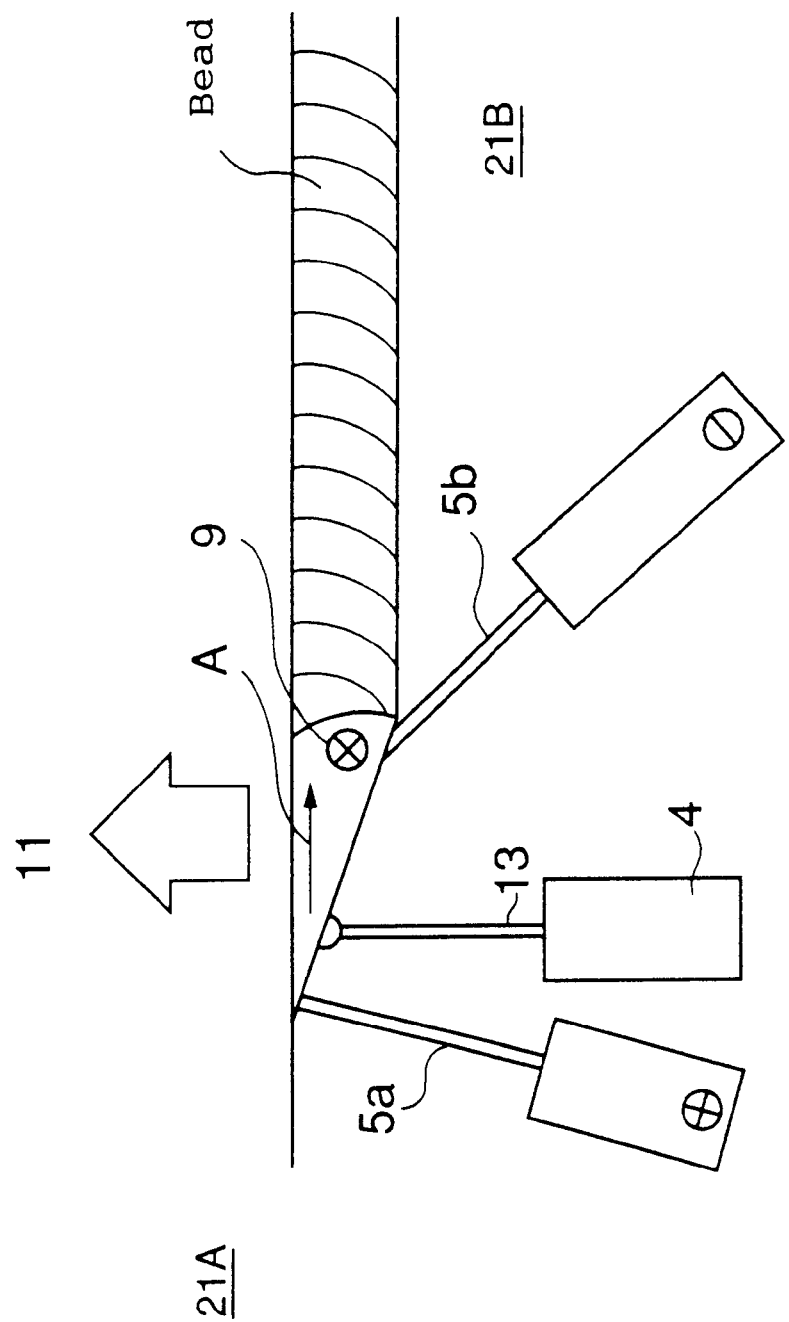
FIG. 3 illustrates how the molten metal is held up in the overhead welding scheme according to this invention.

With this arrangement, as can be seen in FIG. 3, when a current flows between the aforesaid wires 5a and 5b, a unidirectional current A is generated along the welding path.

Figure 7:
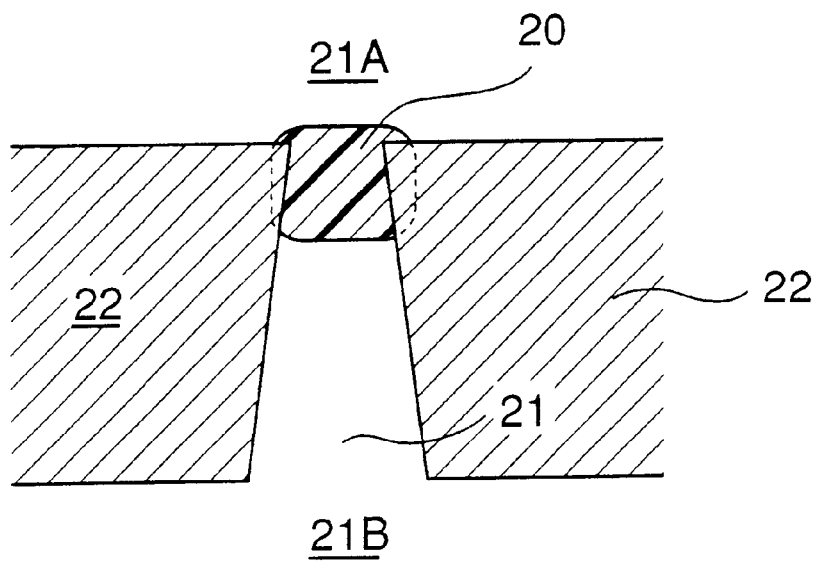
FIG. 7 is a cross section of the bead when the present invention is employed.

When a magnetic field 9 is excited parallel to the surface of the parent material and orthogonal to the aforesaid unidirectional current A, a Lorentz force 11 is exerted towards the upper top side 21A of the groove, or in an upward direction. When this scheme is used to weld the first layer in the overhead position, the upper top side of the groove will not be undercut, and the bottom will not have an improper angle of junction, as shown in FIG. 7. From the second layer on, just as with the first layer, the bead will have the proper angle of junction between the groove and the walls.

When used in vertical welding, this scheme enhances the efficiency of the process by preventing the molten metal from dripping down the surface of the parent material.

Just as with TIG (tungsten inert gas) hot-wire welding methods used in the prior art, running current through auxiliary wires 5a and 5b causes a Joule effect heating of those wires, which in turn increases their rate of deposition.

In this embodiment, the appropriate range of the welding conditions is as follows: The welding current is between 100 and 300 A; the arc voltage is between 12 and 27 V; the welding speed is between 5 and 20 cm/min; the magnetic flux density is between 38 and 300 Gauss; and the current between the auxiliary wires is between 70 and 200 A.

The range of values for the welding current is that in which the movement of the drop and the shaping of the bead can be accomplished in a stable fashion. The range for the arc voltage is that in which the arc can be maintained in a stable fashion when the aforesaid welding current is within its specified range. The range of welding speed is that in which the proper volume is deposited per unit of welding length with respect to the given welding current. The range of magnetic flux density is that needed to generate the electromagnetic force required to improve the shape of the bead and maintain the arc in a stable fashion. The range of current between the auxiliary wires is that in which the amount of electromagnetic force needed to improve the shape of the bead can be generated and in which the wires melt in a stable fashion.

The welding conditions described above may vary depending on the diameter and material of the consumable electrode and auxiliary wires which are used, and the shape, material, etc. of the parent material.

EMBODIMENT 2

Figure 2:
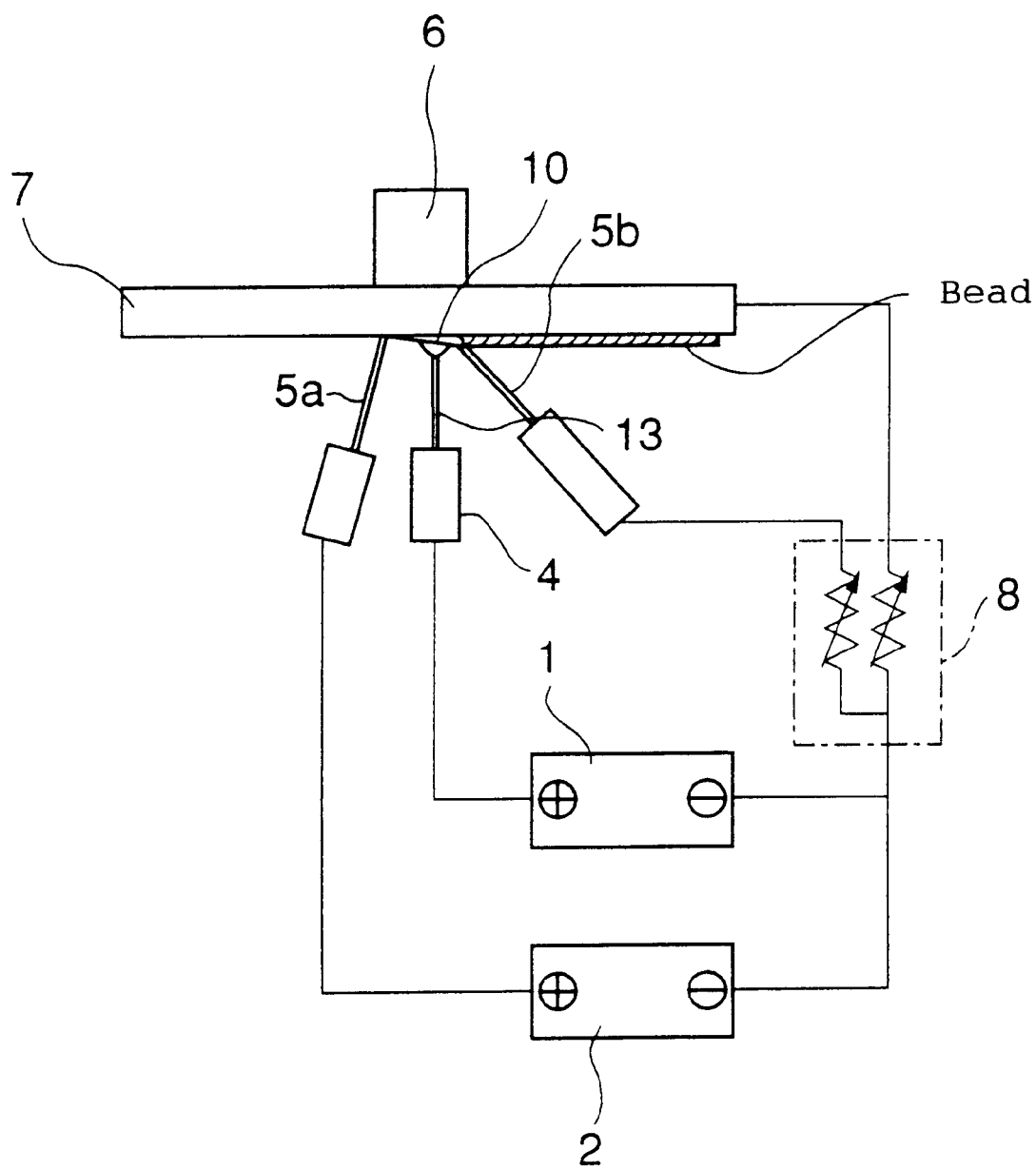
FIG. 2 illustrates the circuit connections in a welding device which is the second ideal embodiment of this invention.

As shown in FIG. 2, the same MAG welding scheme as employed in Embodiment 1 is used, but a portion of the welding current is split off and passed through the auxiliary wires by a diverter 8 to achieve the same result as in Embodiment 1.

EMBODIMENT 3

Figure 4:
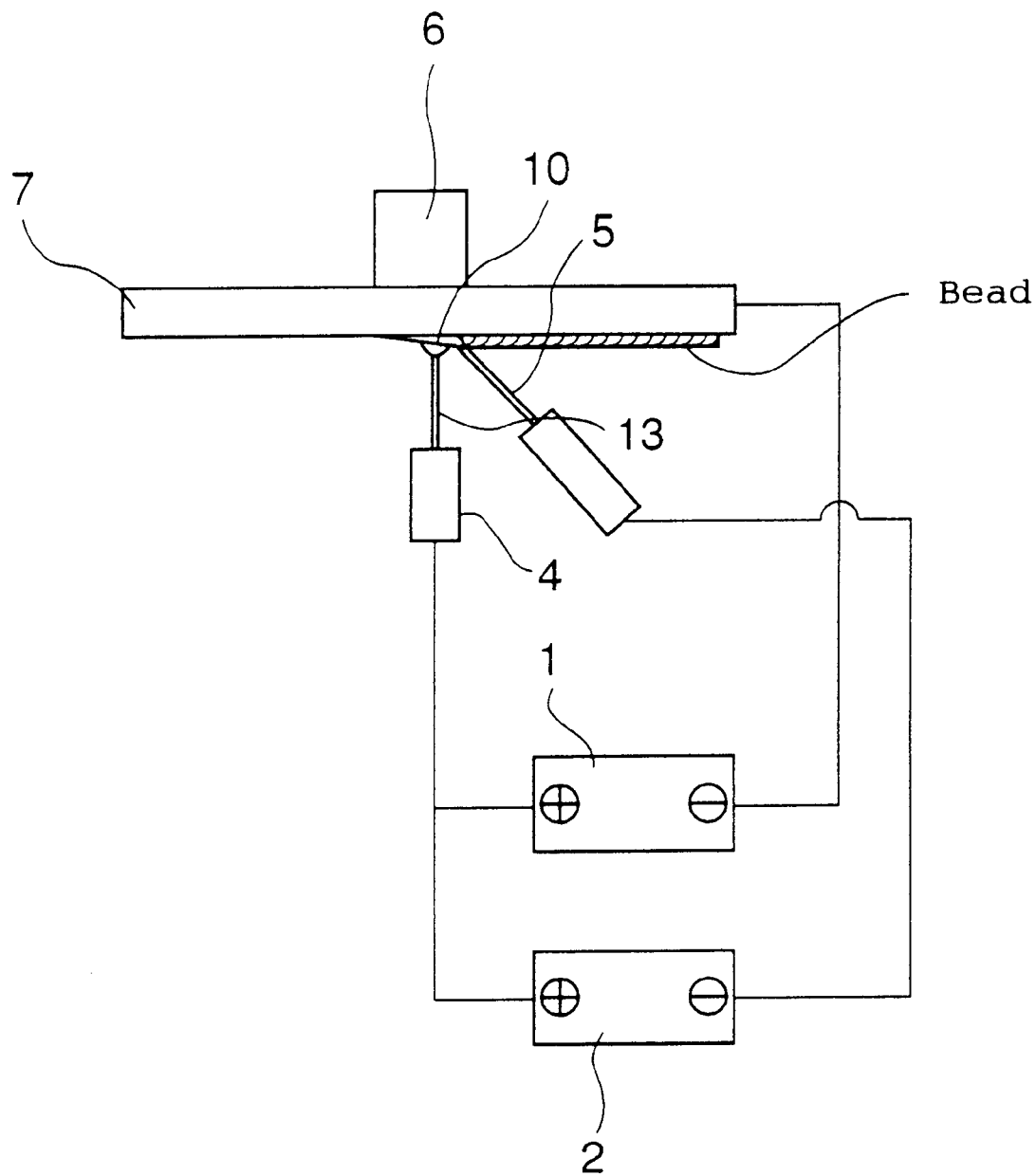
FIG. 4 illustrates the circuit connections in a welding device which is the third ideal embodiment of this invention.

As shown in FIG. 4, the same MAG welding scheme as employed in Embodiment 1 is used, but instead of two auxiliary wires 5a and 5b, a single auxiliary wire 5 and a consumable electrode 13 on welding torch 4 are employed. Insofar as a unidirectional current is generated between consumable electrode 13 and wire 5 in the direction of the weld line, the same effect is achieved as in Embodiment 1.

EMBODIMENT 4

Figure 5:
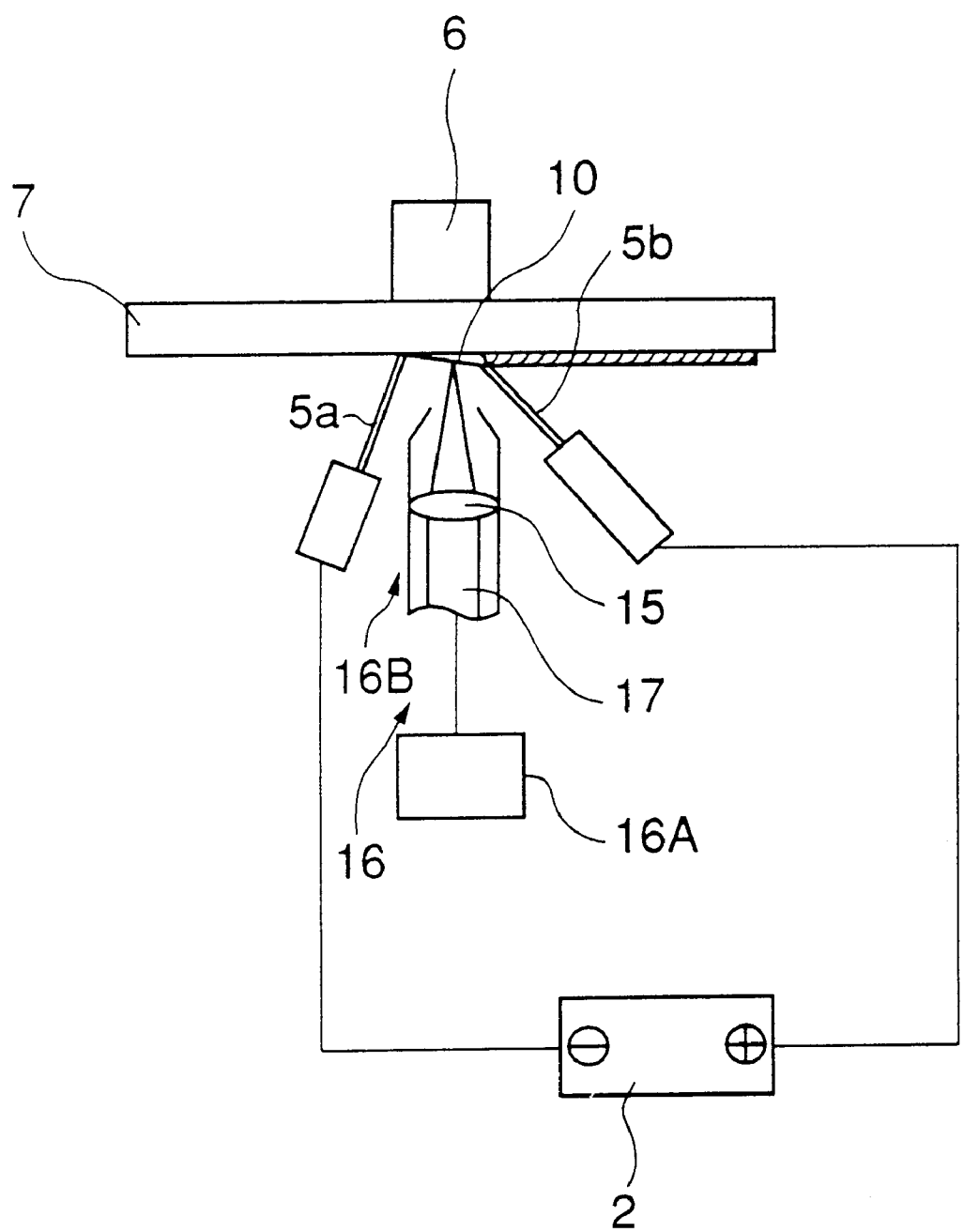
FIG. 5 illustrates the circuit connections in a welding device which is the fourth ideal embodiment of this invention.
Figure 6:
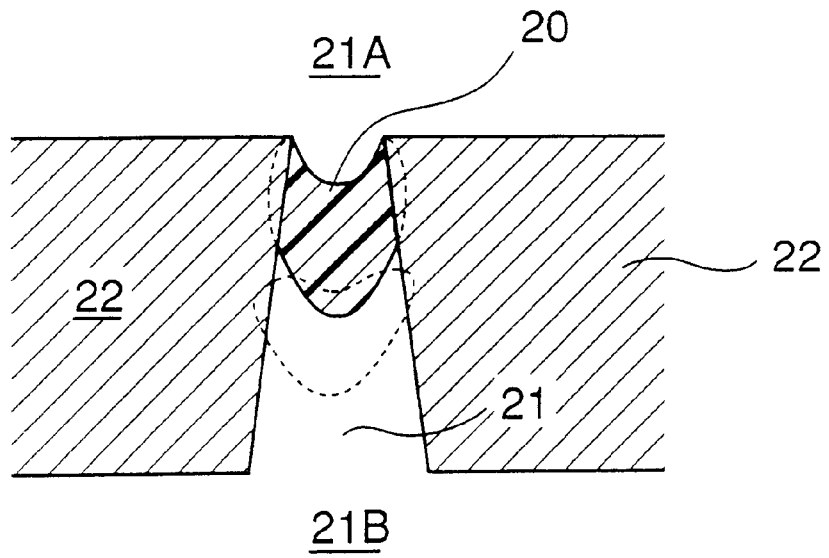
FIG. 6 is a cross section of the welding location in a prior art welding scheme.

In FIG. 5, laser processor 16 comprises YAG or $CO_2$ laser oscillator 16A and main unit 16B which uses condenser lens 15 to condense laser beam 17. The YAG or $CO_2$ laser is used as the heat source for welding, and auxiliary wires 5a and 5b are placed so as to generate a unidirectional current in the direction of the weld line. The only current flowing in molten pool 12 is that between wires 5a and 5b, so the same result is achieved as in Embodiment 1. A YAG laser is used with an output of 4.5 KW, an electron beam acceleration voltage of 60 KV, and a beam current of 10 mA. In this embodiment, only the auxiliary wires are used as the filling metal.

EMBODIMENT 5

When the first layer is being MAG welded and there is no conductor ahead of the welding arc in the welding direction, the arc current is generally unidirectional in the direction opposite the welding direction, even without the use of separate means such as auxiliary wires to create a unidirectional current. (See FIG. 8.) Thus the same effect can be achieved as in Embodiment 1.

Figure 8:
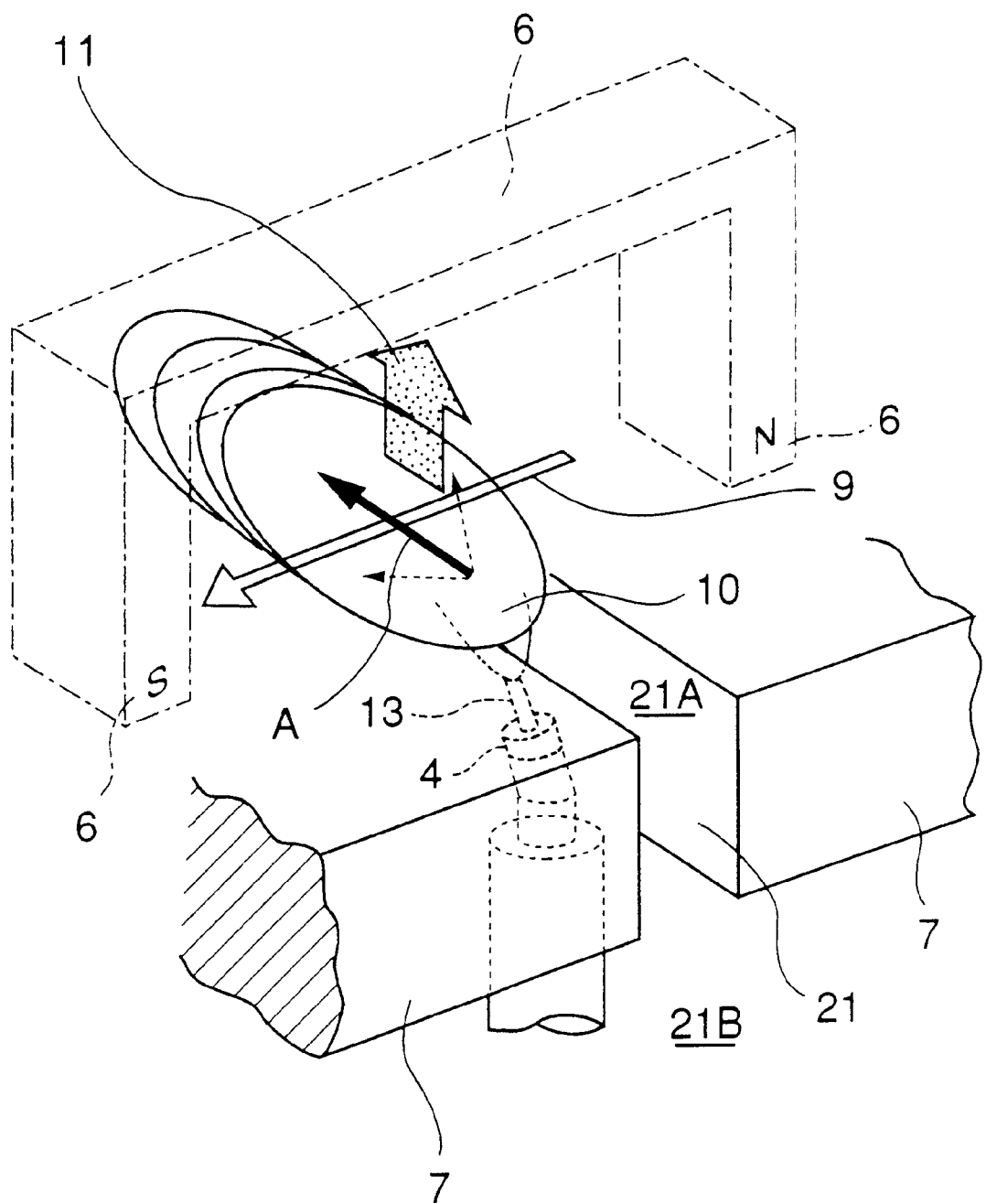
FIG. 8 is a perspective drawing of a welding device which is the fifth ideal embodiment of this invention.

In FIG. 8, the shape and placement of magnet 6 are specified. Permanent or electromagnet 6 is shaped like a flattened horseshoe with poles 6N and 6S on either end. It is placed so that it straddles groove 21 on the side of upper surface 21A, with poles 6N and 6S on either side of the gap between the two segments of parent material 7. This arrangement allows a magnetic field to be applied which is parallel to parent material 7 and orthogonal to the weld line.

EMBODIMENT 6

Figure 9:
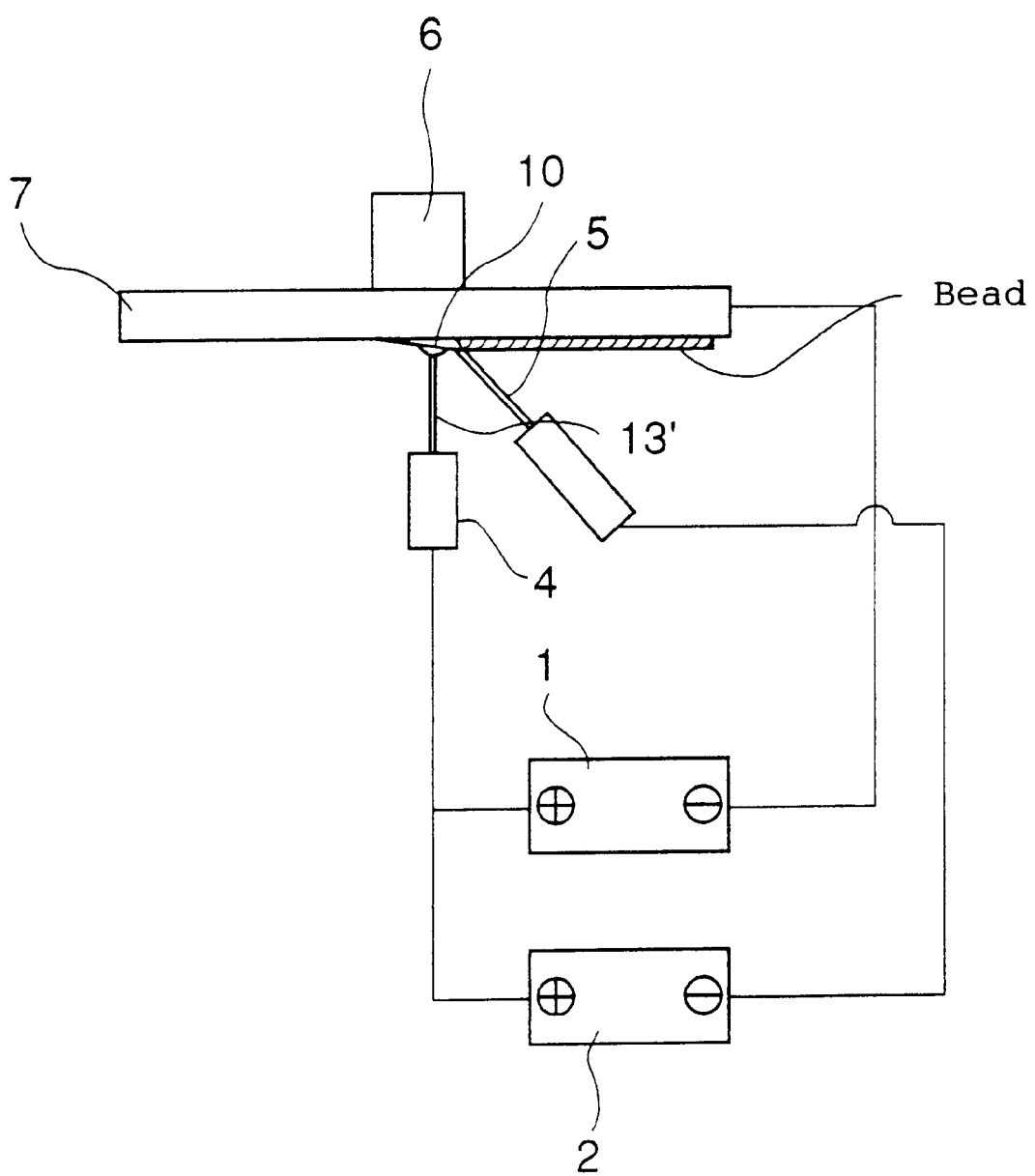
FIG. 9 illustrates the circuit connections in a welding device which is the sixth ideal embodiment of this invention.

FIG. 9 shows a TIG welding device. In TIG welding, also, a unidirectional current is generated along the welding direction between nonconsumable electrode 13' and auxiliary wire 5 just as in FIG. 4. This allows the same result to be achieved as in Embodiment 1. In this embodiment, only the auxiliary wire is used as the source of fill metal.

EMBODIMENT 7

Figure 10:
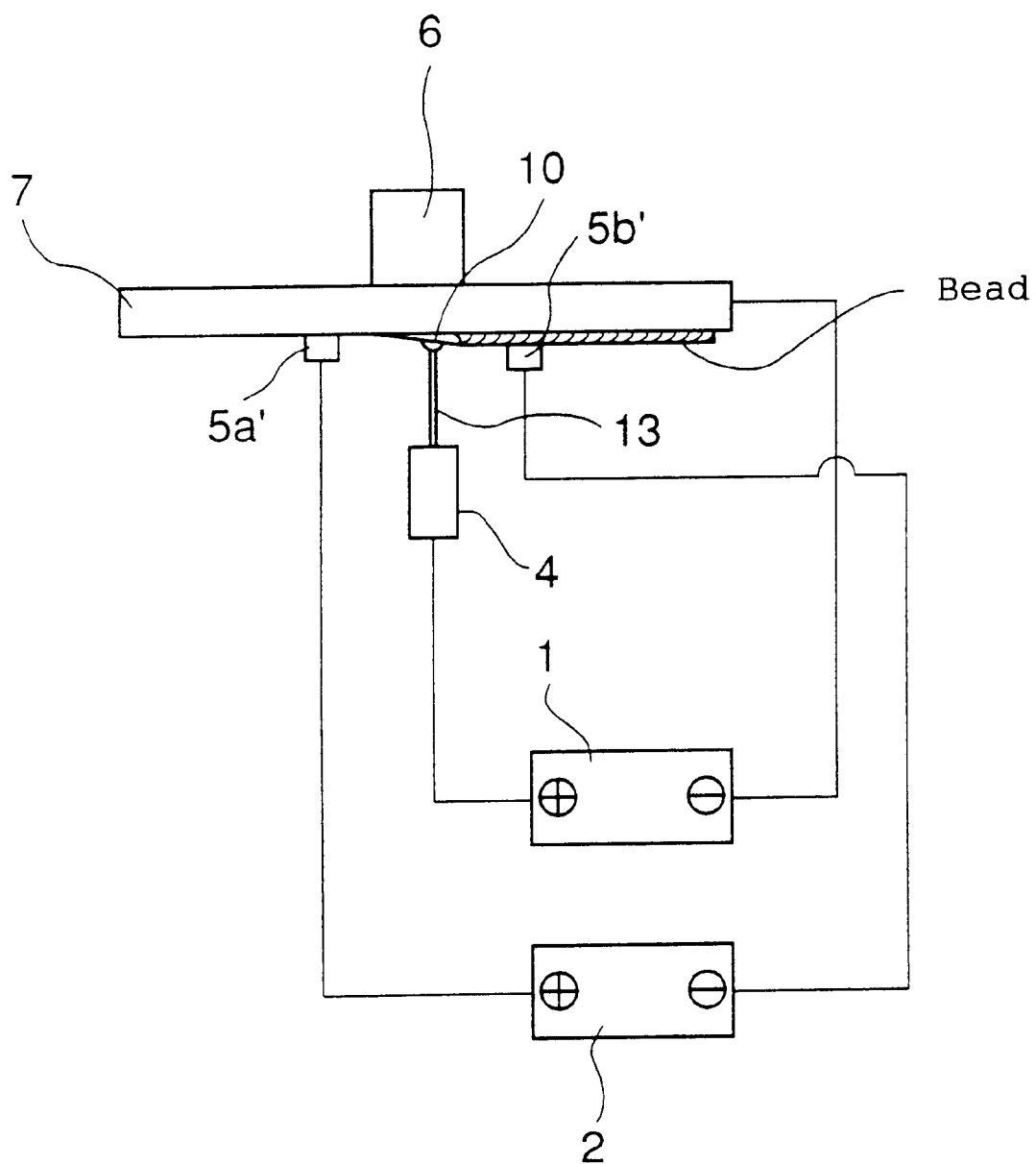
FIG. 10 illustrates the circuit connections in a welding device which is the seventh ideal embodiment of this invention.

In MAG welding, as shown in FIG. 10, a set of two Cu feeder element 5a' and Cu collector element 5b' are placed ahead of and behind the welding location. If a unidirectional current is made to flow between the collector elements, the same result is achieved as in Embodiment 1. The collector elements move as a single entity with the welding torch.

EFFECTS OF THE INVENTION

As has been described above, when this invention is employed in overhead and vertical welding, a unidirectional current is generated in the molten pool along the direction of the weld line. When this current flows in conjunction with a magnetic field, a Lorentz force is generated in the molten pool in an upward direction of the groove. This prevents the molten metal from dripping downward and so improves the shape of the bead.

What is claimed is:

1. A welding method to weld a parent material having a groove in overhead or vertical positions, comprising a step of:

generating a unidirectional current flow in a molten pool along a direction of a weld line, said current flow being independent from a welding current; and inducing a magnetic field in said molten pool parallel to a surface of said parent material and orthogonal to said direction of said weld line to exert a Lorentz force in an upward direction of said groove.

2. A welding method to weld a parent material having a groove in overhead or vertical positions according to claim 1, wherein said unidirectional current flow is generated by a set of Cu feeder and Cu collector elements which are positioned along said direction of said weld line.

3. A welding method to weld a parent material having a groove in overhead or vertical positions according to claim 2, wherein said set of Cu feeder and Cu collector elements move with a welding torch.

4. A welding method to weld a parent material having a groove in overhead or vertical positions according to claim 1, wherein said unidirectional current is a split current of a welding current which is split by a diverter.

5. A welding method to weld a parent material having a groove in overhead or vertical positions according to claim 1, wherein said magnetic field is induced by a permanent magnet.

6. A welding method to weld a parent material having a groove in overhead or vertical positions according to claim 5, wherein said permanent magnet is positioned at rear side of said parent material, which is opposite side of a welding torch.

7. A welding method to weld a parent material having a groove in overhead or vertical positions according to claim 5, wherein said DC electromagnet is positioned at rear side of said parent material, which is opposite side of a welding torch.

8. A welding method to weld a parent material having a groove in overhead or vertical positions according to claim 1, wherein said magnetic field is induced by a DC electromagnet.

* * * * *